(12) United States Patent
Claes

(10) Patent No.: US 9,411,643 B2
(45) Date of Patent: Aug. 9, 2016

(54) METHOD OF PERFORMING TASKS ON A PRODUCTION COMPUTER SYSTEM AND DATA PROCESSING SYSTEM

(71) Applicant: Fujitsu Technology Solutions Intellectual Property GmbH, Munich (DE)

(72) Inventor: Heinz-Josef Claes, Nidderau (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/189,145

(22) Filed: Feb. 25, 2014

(65) Prior Publication Data

US 2014/0245310 A1    Aug. 28, 2014

(30) Foreign Application Priority Data

Feb. 27, 2013  (DE) .................. 10 2013 101 954
Mar. 6, 2013   (DE) .................. 10 2013 102 229

(51) Int. Cl.
*G06F 9/52*    (2006.01)
*G06F 9/48*    (2006.01)
*G06F 21/62*   (2013.01)

(52) U.S. Cl.
CPC ............ *G06F 9/4881* (2013.01); *G06F 9/4843* (2013.01); *G06F 21/629* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 7,194,473 B1* | 3/2007 | Hichwa et al. | |
| 2005/0289655 A1* | 12/2005 | Tidwell et al. | 726/27 |
| 2007/0044155 A1* | 2/2007 | Pletka et al. | 726/25 |
| 2008/0126765 A1* | 5/2008 | Moser et al. | 712/226 |
| 2009/0183234 A1 | 7/2009 | Oswald et al. | |
| 2010/0205241 A1* | 8/2010 | Lin et al. | 709/203 |
| 2014/0245310 A1 | 8/2014 | Claes | |

FOREIGN PATENT DOCUMENTS

EP    2 772 856    9/2014

OTHER PUBLICATIONS

Slonneger, K., "XML-RPC," URL:http://homepage.cs.uiowa.edu/~slonnegr/xml/10.XML-RPC.pdf, Jan. 1, 2006, pp. 1-40.

(Continued)

*Primary Examiner* — Hang Pan
(74) *Attorney, Agent, or Firm* — DLA Piper LLP (US)

(57) ABSTRACT

A method of performing tasks on a production computer includes retrieving a one task description file stored on a task computer and containing a description of a task on a production computer, transferring the task description file from the task computer to a production computer, causing the production computer to check that the file is associated with at least one task stored on the production computer, performing the task associated with the file in the production computer using the file, if the association check was successful, wherein the task computer has open ports and the production computer keeps the ports closed so that access by a user of a first user group to the task computer is arranged, but access by a user of the group to the production computer is prevented while steps above are performed in a predetermined operating state of the production computer.

14 Claims, 3 Drawing Sheets

(56) References Cited

OTHER PUBLICATIONS

Bethge, O.T., "Methods for Preventing Communication between Two Computers," *Ruhr-University Bochum, Department for Data Processing*, URL:http://www.ruhr-uni-bochum.de/dv/studienarbeiten/s282/s282.pdf, Jan. 1, 2000, pp. 1-48 (English translation of first page).

Glenn, W. et al., "User Account Setup and Management," *Microsoft Press*, Jan. 1, 2005, pp. 321-329 (English translation of first page).

"Port (Computer Networking)," *Wikipedia*, Jan. 11, 2012, printout from website (English and German versions).

OASIS: "An Introduction to WSDM," URL: http://docs.oasis-open.org/wsdm/wsdm-1.0-intro-primer-cd-01.pdf; Feb. 24, 2006.

Web Services Interoperability Organisation: "Basic Security Profile Version 1.1," URL: http://www.ws-i.org/Profiles/BasicSecurityProfile-1.1.html; Jan. 24, 2010.

Wikipedia: "Principle of Least Privilege," URL: http://en.wikipedia.org/w/index.php?title=Principle_of_least_privilage&oldid=519103964; Oct. 21, 2012.

Wikipedia: "Simple Network Management Protocol," URL: http://de.wikipedia.org/w/index.php?title=Simple_Network_Management_Protocol&oldid=112757509; Jan. 10, 2013.

Wikipedia: "X.509," URL: http://de.wikipedia.org/w/index.php?title=X.509&oldid=114290543; Feb. 16, 2013.

Wikipedia: "XML-Validation," URL: http://en.wikipeda.org/w/index.php?title=XML_validation&oldid=538905849; Feb. 18, 2013.

Wikipedia, "Secure Copy," https://web/archive.org/web/20130131203747/http://en.wikipedia.org/wiki/Secure_copy, Jan. 31, 2013, three pages, XP055259362.

Krzywinski, M. "Port Knocking: Network Authentication Across Closed Ports," SysAdmin Magazine, Feb. 3, 2013, vol. 12, pp. 12-17, printout from http://web.archive.org/web/20130203180934/http://www.portknocking.org/, 6 pages, XP055291495.

Perelman, V., et al., "Flow Signatures of Popular Applications," 12th IFIP/IEEE International Symposium on Integrated Network Management, 2011, pp. 9-16.

Wikipedia, "File Transfer," URL: http://web.archive.org/web/20120523180012/http://en.wikipedia.org/wiki/File_transfer, May 23, 2012, XP055226723.

Green, M. L., et al., "Grid-Enabled Virtual Organization Based Dynamic Firewall," Grid Computing 2004 Proceedings, Firth IEEE/ACM International Workshop, Nov. 2004, pp. 208-216.

Matei, C. M., et al., "Internet Banking Integration within the Banking System," *Informatica Economià nr.*, 2(46), 2008, pp. 55-59, URL: http://revistaie.ase.ro/content/46/Matei,%20Silvestru,%20Silvestru.pdf.

Debry, R., et al., "Internet Printing Protocol—IPP/1.0," Internet Engineering Task Force, URL: http://wftp3.itu/av-arch/jctvc-site/, Nov. 1996, pp. 1, 18, 19 & 26.

Rhodes, B., "On Securing the Public Health Information Network Messaging System," Proceedings of the 4th Annual PKI R&D Workshop, "Multiple Paths to Trust" Proceedings, Aug. 2005, pp. 194-201, URL: http://csrc.nist.gov/publications/nidtir/ir7224/NISTIR-7224.pdf.

\* cited by examiner

METHOD OF PERFORMING TASKS ON A PRODUCTION COMPUTER SYSTEM AND DATA PROCESSING SYSTEM

TECHNICAL FIELD

This disclosure relates to a method of performing tasks on a production computer system and also to a data processing system having at least one such production computer system.

BACKGROUND

In distributed computer networks (computer systems, in particular servers, which communicate with each over data connections), operating or maintenance personnel (so-called operators or administrators) have access capabilities (e.g., to the hardware of the individual computer systems) and rights (e.g., access rights to software, data, files). In particular, in computer networks which have server-client topologies, a wide range of administration tasks is required. For example, access to individual computer systems is required to perform particular actions (so-called "tasks"). Such tasks can relate, for example, to restarting an application, backup or recovery processes or access to a corrupt database. In so doing, the persons are able in some circumstances to read (confidential) data on the computer systems being operated. However, access by administrators or other persons to data may be problematic from the point of view of data privacy protection.

Typical approaches that increase data privacy protection are directives (processes which should be adhered to) and rules (commands or prohibitions). In particular, access to confidential data in a computer system is limited by pre-defined access rights so that only (trustworthy) persons who have the relevant rights have access to the confidential data.

In securing data, such approaches are beneficial for improving data privacy protection but have the disadvantage that they are not stringent measures to prevent access to confidential data. For instance, employees (e.g., administrators or operators) of a service provider may be criminals or may be bribed or may find themselves in a predicament which leads to the above-mentioned directives and rules being improperly circumvented.

It could therefore be helpful to improve, by way of technical features, protection against unauthorized access in particular to confidential data within a computer system processing and storing the data as a so-called "production" computer system, while nevertheless ensuring satisfactory administration of the production computer system.

SUMMARY

I provide a method of performing tasks on a production computer system including retrieving at least one task description file stored on a task computer system and containing a description of a task on a production computer system, automatically transferring the task description file from the task computer system to a production computer system, causing the production computer system to check that the task description file is associated with at least one task stored on the production computer system, performing the task associated with the task description file in the production computer system using the task description file, if the association check was successful, wherein the task computer system has open ports and the production computer system keeps all the ports closed so that access by a user of a first user group to the task computer system is arranged, but access by a user of the first user group to the production computer system is prevented at least while one or more of the above steps are being performed in a predetermined operating state of the production computer system.

I also provide a data processing system including a task computer system and a production computer system, wherein the task computer system contains one or more predetermined task description files which each contain a description of one or more tasks on the production computer system, and wherein the production computer system is arranged to perform predetermined actions and contains one or more tasks associated with the task description files, a predefined task on the production computer system can be performed in a controlled manner by transferring a task description file from the task computer system to the production computer system, and the production computer system has a first access control unit and the task computer system has a second access control unit, which access control units are arranged to allow access by a user of a first user group to the task computer system, but to prevent access by a user of the first user group to the production computer system at least in a predetermined operating state of the production computer system such that the task computer system has open ports and the production computer system keeps all ports closed.

LIST OF REFERENCE NUMERALS

Figure 1:
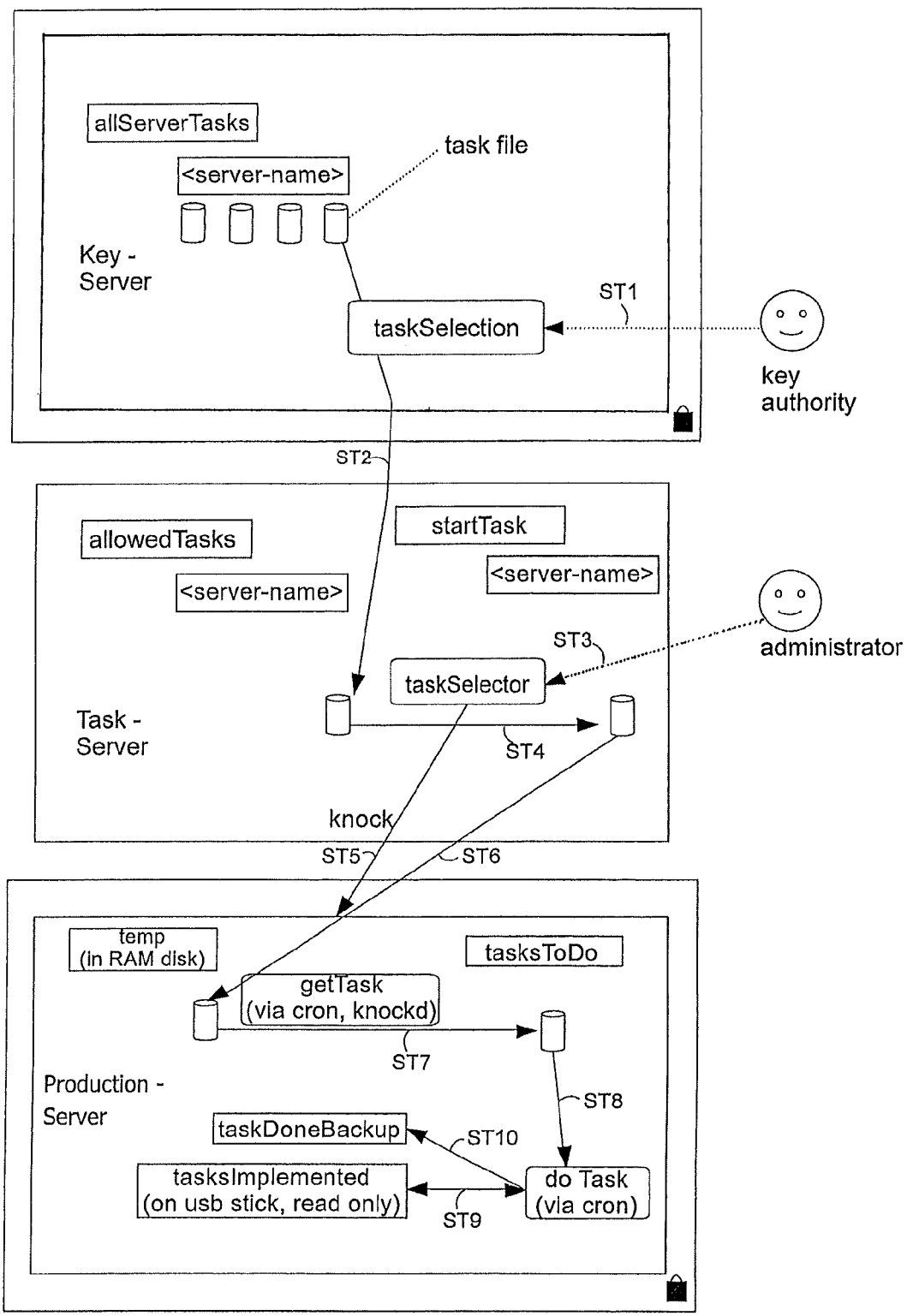
FIG. 1 shows a schematic process structure to configure and perform a task.

Administrator User of a first user group
Key authority User of a second user group
ST1 to ST10 Method steps for performing a task
SB1 to SB3 Method steps for performing a backup process
SR1 to SR5 Method steps for performing a restore process
SN1 to SN9 Method steps for renaming files

DETAILED DESCRIPTION

My methods include the steps of:
 retrieving at least one task description file which is stored on a task computer system and contains a description of a task on a production computer system,
 automatically transferring the task description file from the task computer system to a production computer system,
 the production computer system checking that the task description file is associated with at least one task stored on the production computer system,
 performing the task associated with the task description file in the production computer system using the task description file, if the association check was successful,
wherein the task computer system has open ports and the production computer system keeps all the ports closed so that access by a user of a first user group to the task computer system is arranged, but access by a user of the first user group to the production computer system is prevented at least while one or more of the above steps are being performed in a predetermined operating state of the production computer system.

In such a method, (in a predetermined operating state) conventional access by administrators or service personnel (or even other users), which can form users of the first user group, to the production computer system is prevented.

Therefore, the method allows prevention of access to confidential data stored in the production computer system. In this case, an administrator is no longer able to authenticate himself or log-in using conventional means on the production computer system, e.g., in UNIX-based systems via a Secure Shell (SSH) daemon or to perform specific actions on the production computer system itself, e.g., to retrieve a backup by a conventional backup tool or to access databases. In this case, only access by users of the first user group to the task computer system is allowed.

However, since an administrator must be able to initiate particular actions on the production computer system to complete the administrative tasks, the method explained above is provided.

The important elements involved are a task computer system and a production computer system. The task computer system is the entity via which users of the first user group, e.g., administrators, can perform predefined actions (tasks) on the production computer system. From the point of view of the users of the first user group, the task computer system can be "open" (e.g., have open ports) and thus be less secured than the production computer system which, under certain conditions, keeps all the ports (permanently) closed. Particular applications can be provided on the task computer system for the selection and initiation of tasks on the production computer system.

The production computer system is the target of actions which can be performed or are to be performed thereon. In this regard, a differentiation may be made, for example, between actions not relating to data privacy protection (e.g., restarting an application) and actions relating to data privacy protection (e.g., required access by a database administrator in the event of a corrupt database).

The core principle of the method is the systematic separation of the initiation of predetermined tasks by users (task computer system) from the storage or processing location (production computer system) at which confidential data are present or are processed. In the general or normal case (predetermined operating state), a user of the first user group can no longer access the production computer system. However, the user can assign particular predefined tasks to the production computer system from the task computer which is logically/physically remote, which tasks are then performed on the production computer system under certain conditions.

In this respect, so-called "task description" files are stored on the task computer system, which files state and describe the tasks to be performed and are predefined on the production computer system. A user of the first user group can select the task description files to initiate a predetermined action on the production computer system at a defined point in time, which action is associated with a predetermined task description file on the task computer system. Advantageously, a user of the first user group is only permitted to make a selection but cannot process or change a task description file.

To perform a task, a user of the first user group selects on the task computer system (e.g., via a graphical user interface provided for this purpose) a task predefined on the production computer system from a list of task description files located on the task computer system, which list is valid for the production computer system in question. A process is hereby initiated which retrieves the selected task description file in the task computer system and automatically transfers it from the task computer system to the production computer system. The automated transfer of the task description file from the task computer system to the production computer system can already be configured such that a user of the first user group has no way of influencing it and thus the risk of the production computer system being tampered with prior to this step is already eliminated.

After automated transfer of the task description file to the production computer system, a check is made in the production computer system as to whether the task description file is associated with at least one task which is predefined and stored on the production computer system. For this purpose, the content of the task description file can be verified on the production computer system using its internal data bank which cannot be accessed by a user of the first user group. Tampering (if possible) with the content of the task description file on the task computer system, e.g., by a user of the first user group, results merely in an error message on the production computer system which is published, for example, via a monitoring system. The production computer system thus checks whether the tasks defined by the task description files coincide with a task stored on the production computer itself and are thus provided and allowed for the production computer system.

If a corresponding task associated with the task description file is found in the production computer system and if a check of the task description file and its content is positive and successful, then this task can then be performed accordingly using the description stored in the task description file. Acknowledgement is effected via a monitoring tool, unless provision is made otherwise.

The process described by the method thus advantageously allows an action initiated by a user of the first user group and predefined on the production computer system to be performed without a user of the first user group having access to the production computer system in a predetermined operating state. There is no requirement for the production computer system to contain programs which are arranged to be addressable from outside and form a potential gap in security (e.g., by buffer overflow).

A task description file also fundamentally differs from a pure command instruction of a user of the first user group to a production computer system because a command instruction requires a continuously running program which is open to the outside and thus vulnerable so that the production computer system can evaluate the instruction. However, such a program is not provided in the case of my method because a user of the first user group cannot access the production computer system.

The task description file merely includes a description of the task defined in the production computer system, wherein no automatically executable program components or protocol commands whatsoever are required in the task description file, which components/commands can lead to defective responses in the production computer system. The task description file is transferred to the production computer system, wherein all subsequent steps to execute the task can be performed encapsulated within the production computer system without external access being required. An error in the task description file results merely in an error message (mismatch) in the production computer system and if necessary immediate termination of the method.

Preventing access by a user of the first user group to the production computer system can mean in general that the production computer system within a computer network is visible and possibly also addressable for the user, but access protection (e.g., via an access control unit in the production computer system) is provided which does not allow the user to log into the production computer system.

However, it is also feasible that access by the user of the first user group to the production computer system is prevented by virtue of the fact that the production computer system cannot be addressed by the user at all because, for example, it is not even visible to the user in the computer network. In this case, the production computer system is physically unreachable for the user of the first user group and cannot be addressed, e.g., via an IP address.

By reason of the explained method, access protection to, in certain circumstances, confidential data on a production computer system is improved by virtue of the fact that not only particular rules and directives have to be adhered to by users, but also direct access by a user to data on the production computer system can be completely prevented by technical features. To perform administration tasks, a user can still select and automatically initiate a task on the production computer system via the task computer system. Initiation of spontaneous actions, so-called "ad-hoc" tasks, on a server or computer system can thus be effected in an event-controlled manner, satisfactorily allowing interactive processes.

It is feasible to arrange for access prevention to the production computer system to be permanent for particular users and/or to arrange for access prevention for particular users in predetermined operating states of the production computer system. In the latter case, access prevention can be arranged, e.g., in general or normal operation and can be cancelled in exceptional operation, e.g., in the case of predetermined necessary measures (access to corrupt database and the like).

Advantageously, the automated transfer of the task description file from the task computer system to the production computer system comprises the following steps:
  sending a predetermined sequence of packet data from the task computer system to the production computer system, wherein predetermined ports of the production computer system are closed, and wherein the sequence addresses one or more predetermined ports of the production computer system in a predetermined order,
  checking whether the sent sequence coincides with a predefined sequence in the production computer system, and
  transferring the task description file from the task computer system to the production computer system.

These additional method steps have the advantage that basically all ports (relevant for the method) of the production computer system are permanently closed and block external access to the production computer system. A process for transferring the respective task description file (e.g., SCP) can be started after a predetermined sequence of packet data has been sent to the production computer system and if the sequence coincides with a predefined sequence.

Such a method is also known by the term "port knocking" The afore-mentioned steps can be performed, e.g., via a so-called "knock daemon," i.e., a program which enables port knocking. The knock daemon is located on the ports of the production computer system, checks the sequence of packet data sent to the production computer system and initiates if applicable a controlled transfer of the corresponding task description file if the sent sequence coincides with a predefined sequence. The above-described process thus permits the transfer/copying of the task description file from the task computer system to the production computer system without the production computer system having to run an open port with an addressable program for this.

Alternatively or in addition to the port knocking process described above, it is also feasible that the production computer system for its part polls the task computer system at regular intervals asking whether there are one or more task description files to be exchanged. If this is the case, a corresponding transfer of the task description file from the task computer system to the production computer system can be initiated.

Advantageously, the transfer of the task description file from the task computer system to the production computer system is initiated by the production computer system. This has the advantage that the task description file is transferred upon an instruction by the production computer system (e.g., via SCP), wherein the production computer system can control, e.g., the exchange process. The production computer system thus does not behave in a passive manner waiting until the task description file is sent.

Advantageously, the task description file, before being transferred to the production computer system, is stored in a predefined exchange directory within the directory structure of the task computer system. The task description file can, for example, be copied into the exchange directory so that it is still in the task computer system for a new retrieval at a later point in time (when the associated task is to be performed again) and can be retrieved. A further advantage resides in the fact that upon an initiative by the production computer system to transfer the task description file, access is made to a predefined exchange directory without having to search for the task description file in the task computer system, for example. Therefore, the exchange directory acts as a pull directory from which the production computer system can fetch the task description file for transfer. This facilitates a transfer process, e.g., via SCP.

Advantageously, prior to the transfer of the task description file from the task computer system to the production computer system, the production computer system requests the file size of the task description file, wherein the task description file is transferred to the production computer system only when the file size does not exceed a predetermined threshold. Otherwise, an error message, for example, can be output to a user of the first user group via the task computer system and/or the method can be terminated. This procedure has the advantage that disruption of the production process in the production computer system by handling huge task description files is prevented.

Preferably, in the explained method, in addition to the task computer system and the production computer system, a so-called "key" computer system is arranged which manages predetermined access rights and/or keys of users of a second user group which differs from the first user group, and the key computer system provides a configuration option to configure predetermined execution or performance parameters for a task of the production computer system.

Furthermore, the method comprises the following steps using the key computer system:
  creating a task description file using configured execution parameters, and
  automatically transferring the task description file from the key computer system to the task computer system, wherein access by a user of the second user group to the key computer system is arranged, but at least in a predetermined operating state of the key computer system access by a user of the first user group to the key computer system is prevented.

In addition to the task computer system and the production computer system, a key computer system is thus also involved in the method. The key computer system manages keys and/or authorizations of users of a second user group. The key computer system can thus be reached, used and operated only by persons for whom a particular role is assigned (e.g., a so-called security manager or key authority). This role is independent and separate from the role of a user of the first user group, who, e.g., is appointed as an administrator. Advantageously, the key computer system can be localized in a particularly secure and decentralized manner—physically unreachable and not addressable via an IP address for persons of the first user group.

The key computer system is particularly used in the method of the type explained herein to define or configure tasks to be performed on the production computer system so that predetermined actions can be initiated on the production computer system. In particular, execution parameters for tasks can be determined on the basis of which one or more task description files are created in the key computer system. These configured and created task description files are then automatically transferred from the key computer system to the task computer system. This automated transfer can be effected such that the key computer system addresses an open port of the task computer system and the task description files are accordingly stored in prepared directories in the task computer system. Advantageously, however, predetermined ports of the key computer system are (permanently) closed so that the task computer system conversely cannot access the key computer system.

In addition, provision is made that exclusively a predefined set of people of a second user group, which differs from the first user group, has access to the key computer system. As already explained, users of the first user group can access the task computer system to initiate the performance of tasks on the production computer system using the task description files stored in the task computer system. In an advantageous manner, a user of the first user group is prevented from changing the task description files in the task computer system. Furthermore, access by a user of the first user group to the key computer system is advantageously prevented at least in a predetermined operating state of the key computer system. This means that a user of the first user group cannot configure performance parameters in the key computer system. In this manner, the data security is thus also separated into two different user groups by separating the configuration of task description files and the mere execution of tasks on the production computer system by the task description files.

In particular, by using the key computer system a differentiation can be made between actions not relevant to data privacy protection and actions relevant to data privacy protection. Tasks relevant to data protection, which can adversely affect the security of the system (access protection and data protection) can only be performed in special (exceptional) cases and/or for limited periods of time. In the case of a task which can only be performed, for example, in a predetermined period of time, e.g., between 10 am and 10.15 am on date DD.MM.YYYY, this period of time is defined by a user of the second group, e.g., a security manager, via the key computer system. Furthermore, this parameter is prevented from being subsequently tampered with by suitable methods (e.g., by encrypting/signing with a private key of the key computer system or the respective user). Information stating which task can be performed at which time can be made available so that it can also be read by other user groups.

Then, a task description file with the preconfigured parameters is created in the key computer system and the created task description file is transferred to the task computer system. Subsequently, a user of the first user group can, as already explained, display, select and retrieve the corresponding task. A corresponding process to automatically transfer the corresponding task description file from the task computer system to the production computer system and a final execution of the associated task in the production computer system can then be performed, as already explained. In particular, it is advantageous if a user of the first user group, after selection and determination of the performance of a task, also signs the associated task description file with a private key. This improves traceability in the process.

Advantageously, the creation of the task description file includes encrypting and/or signing the contents of the task description file using a key of a user of the second user group. Alternatively, a key of the key computer system can also be used. Advantageously, while the production computer system checks as to whether the created task description file is associated with at least one task stored on the production computer system within the automated task performing process in the production computer system, authenticity of a user of the second user group (and if applicable also the authenticity of a user of the first user group) is also checked. This can be effected, e.g., with the aid of a used key or a signature of the user of the first and/or second user group or the key computer system. In this manner, a check can be made as to whether a corresponding task description file is valid and/or has been created by a person authorised to do so. Therefore, in this manner undesired tampering with task description files can also be counteracted.

Advantageously, prior to performing a task associated with the created task description file in the production computer system using the created task description file, validity of the configured execution parameters is checked and the associated task is only performed if the configured execution parameters are valid. For example, a check can be made as to whether the point in time allocated by a user of the first user group to perform a task is within the time frame predetermined by a user of the second user group, which time frame is predetermined in the created task description file. If, for example, an administrator instructs, via the task computer system, the production computer system to perform an associated task at 9 am and if only a time frame between 10 am and 10.15 am is configured in the task description file by a user of the second user group, then the allocated point in time is outside the created time frame. In this case, a decision can be made to perform the task only at the set time or to output an error message or to terminate the method.

To further increase data protection, provision is advantageously made in the method explained herein that access by a user of the second user group to the production computer system and/or the task computer system is prevented. In this manner, a user of the second user group can only access the key computer system. A user of the first user group can only access the task computer system. However, no user, either of the first user group or of the second user group, can access the production computer system. This is encapsulated and protected against any access.

The data processing system includes at least one task computer system and one production computer system, wherein the task computer system contains one or more predetermined task description files which each contain a description of a task on the production computer system. The production computer system is advantageously arranged to perform predetermined actions and for this purpose contains one or more tasks associated with the task description files. A task on the production computer system can be performed in a controlled manner by transferring a task description file from the task computer system to the production computer system. In an advantageous manner, both the production computer system and also the task computer system have a first and a second access control unit, which access control units are arranged to allow access by a user of a first user group to the task computer system but to prevent access by a user of the first user group to the production computer system at least in a predetermined operating state of the production computer system such that the task computer system has open ports and the production computer system keeps all ports closed.

Also, by way of such a data processing system, tasks can advantageously be addressed on the production computer system in an event-controlled manner, satisfactorily allowing interactive processes. Nevertheless, the production computer system is securely protected against data abuse because access by a user of the first user group to the production computer system is prevented, wherein a user of the first user group can merely order execution of a task by a task description file. Further advantages of the data processing system are produced in a similar manner to the aspects explained with respect to the method presented herein.

Advantageously, the data processing system also comprises a key computer system arranged to manage predetermined access rights and/or keys of users of a second user group and to provide a configuration option to configure predetermined performance parameters for a task of the production computer system. In addition, the key computer system advantageously comprises a third access control unit arranged to allow access by a user of the second user group to the key computer system, but to prevent access by a user of the first user group to the key computer system at least in a predetermined operating state of the key computer system. The advantages explained with respect to the above method are also produced here in a similar manner.

One application of the data processing system is, for example, use of corresponding servers within a secured computer network infrastructure, in which in particular a production server is encapsulated and arranged in addition to a task server and/or a key server in a physically/logically decentralized manner to be protected against being accessed.

In particular, in such a computer network infrastructure, security can be additionally increased by corresponding hardware separation and physical access restrictions for personnel of the data processing system (e.g., administrators, operator, security manager or the like). Furthermore, it is feasible to implement four-eyes principles on the part of the users of the first and/or second user groups.

Further advantages of my methods and also of the data processing systems of the type explained are disclosed in the following description of the figures. My methods and systems will be explained in more detail with the aid of several drawings.

FIG. 1 shows a sequence structure that automatically performs tasks in a production server. FIG. 1 shows a data processing system comprising a key server, a task server and a production server. The key server and production server are provided with a specific access protect-tion (see lock symbol), wherein either only access by particular persons of a selected user group is permitted or no external access at all is allowed during operation. For example, in the case of the production server, no external access by any users is possible at all. The key server and production server can be, for example, part of an encapsulated computer network infrastructure.

Initially, the mode of operation of the key server will be described. In the first method step ST1, the program "taskSelection" is called, triggered by a command from a user of a predetermined user group ("key authority"). This can be effected, for example, via a graphical user interface, e.g., a web browser. The program "taskSelection" can manage, for example, access rights for individual users of a user group who have limited access to the key server as so-called "non-root users." A directory "allServerTasks" can be selected, for example, via the program "taskSelection," subdirectories having server names to be selected ("<server-name>") containing all available tasks (represented by task description files, "task file") for corresponding servers being located in the directory.

A task can be selected or configured via the graphical user interface via a specific function within the program "taskSelection." For this purpose, a request is made in the graphical user interface for a particular server "<server-name>" from the stored list of servers in the directory "allServerTasks." Then, a request is made for a particular task from a list of tasks for the corresponding server (defined by "<server-name>"), which task has been selected from the directory "allServerTasks."

Furthermore, predetermined execution or performance parameters can be determined. For example, it can be determined whether the task in question is a task not relevant to data privacy protection or a task relevant to data privacy protection. Tasks not relevant to data privacy protection can be performed, for example, at any time on the production server, wherein tasks relevant to data protection can only be performed at predetermined points in time and within predetermined periods of time. Further advantageous performance parameters can be set, for example, by a user of the second user group ("key authority") via the graphical user interface. For example, a particular period of time and a particular allowed performance duration can be predetermined for the selected task.

Then, using the set execution parameters, a temporary task description file is created which is signed, for example, by a private key of the key server or of the user of the second user group. Thereafter, the temporary task description file is encrypted with a public key of the production server.

It should be noted in this case that a user of the second user group ("key authority") is generally not authorized to determine new action types for the production server or to tamper with existing action types. A corresponding action type linked with a predefined task must be arranged when the production server is installed and mounted. Only existing tasks can be configured and determined in terms of their type of performance via the key server.

In a second method step ST2, a process is started which transfers the temporary task description file ultimately from the key server to the task server and in particular stores it in a directory "allowedTasks" with a corresponding subdirectory "<server-name>." In particular, the directory "allowedTasks" in the task server contains a task description file for each allowed task of the production server. The task description files stored in the directory "allowedTasks" can, for example, be encrypted with an inaccessible key of the key server. In particular, the task description files are signed or encrypted with a private key of the key server and/or a public key of the production server using the program "taskSelection" in the key server.

To automatically perform a task in the production server, a user of a further user group ("administrator") can access the task server via a further method step ST3 and select in particular the program "taskSelector," e.g., via a graphical user interface. It should be noted here that such an administrator only has access to the task server and not to the key server or production server. In this manner, this user group ("administrator") is separated in terms of its access rights from the user group explained above ("key authority"). The "key authority" can be restricted, for example, to being able to access only the key server which means it does not have access to the task server and/or the production server.

To select a task in the production server, the administrator initially selects in the task server a corresponding server from a list "<server-name>" of production servers (in the directory "allowedTasks"). Then, for example, a predetermined task can be selected from a list of tasks which are allowed for the corresponding server. This task (in the form of a task description file) can be provided, for example, by the administrator with a predetermined performance point in time, wherein a time stamp is automatically added to the task description file. In this manner, the administrator can order that a particular task be performed in the production server at a predefined point in time.

Then, a predefined process can be triggered by the administrator, which process automatically retrieves the selected task description file provided with a time stamp and, in a method step ST4, copies it into a local exchange directory "startTask" with the subdirectory "<server-name>." The selected task description file is thus ready to be transferred to the production server.

In a further method step ST5, predetermined ports of the production server are "knocked" on via a port knocking process and a sequence of predetermined packet data and the production server is informed that a new task description file in the task server is ready to be exchanged to the production server. If the transferred packet data sequence coincides with a predefined sequence in the production server (e.g., checked by a knock daemon), the program "getTask" is automatically selected in the production server.

The program "getTask," e.g., controlled by a so-called "cron daemon" or the knock daemon, then copies, in method step ST6, all the task description files which are stored in the exchange directory "startTask" with the subdirectory "<server-name>" in the task server, into a local temporary RAM directory "temp" on the production server. If this has been completed successfully, then in step ST7 the task description files are stored from this temporary directory "temp" into a local directory "tasksToDo" in the production server.

In a further method step ST8, a script "doTask" is retrieved, e.g., via the cron daemon which searches the directory "tasksToDo" for new task description files and, e.g., retrieves and implements the individual task description files hierarchically, e.g., in dependence upon the stored time stamps. In a step ST9, the script "doTask" compares the content of the retrieved task description files from the directory "tasksToDo" with a data bank stored in the production server, stored in the directory "tasksImplemented" mounted, for example, on a USB stick and only having reading rights. In this manner, a check is made as to whether in general in relation to a corresponding task description file, a task to be performed accordingly exists in the production server. If this can be successfully verified, then the corresponding task can be started accordingly at the point in time of the time stamp defined in the task description file. Performed and completed tasks are moved, in a method step ST10, from the directory "tasksToDo" into a directory "taskDoneBackup." When all the tasks are implemented according to the stored task description files, the method is completed.

Figure 2:
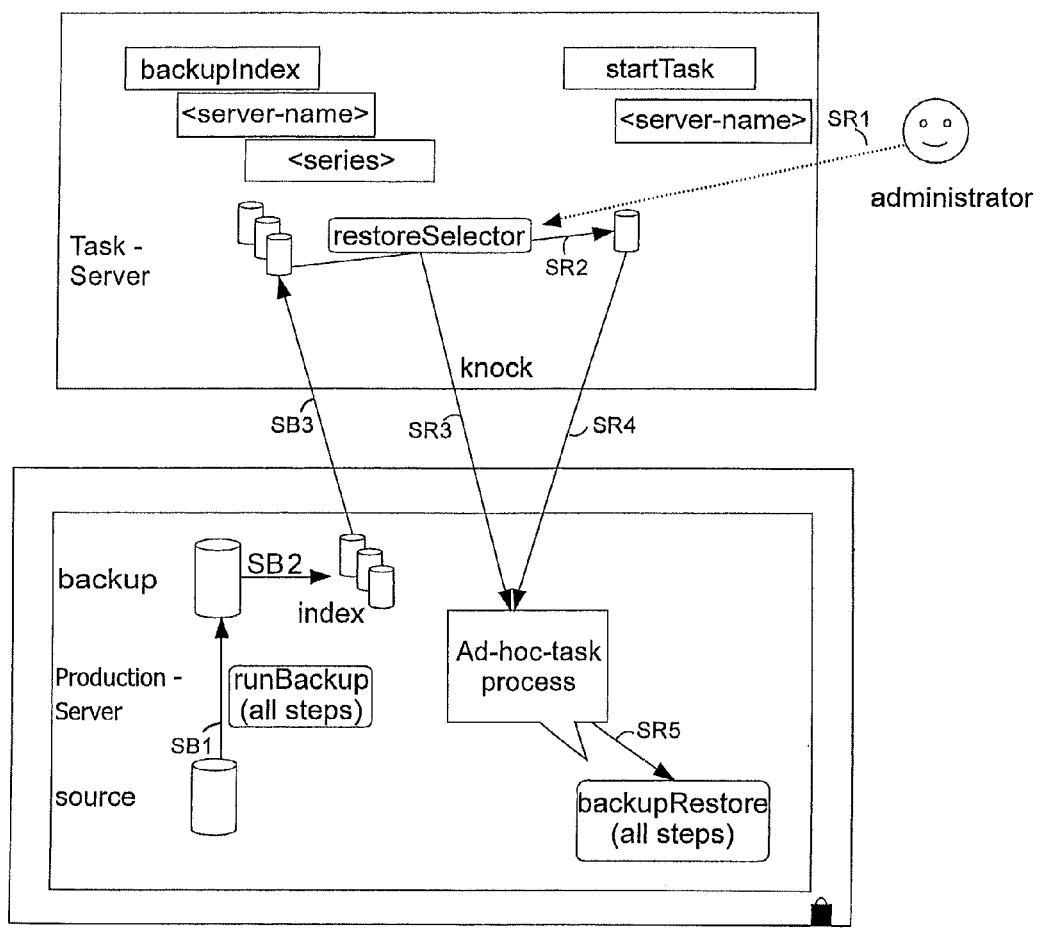
FIG. 2 shows a schematic process structure that performs a backup process or a restore process.

FIG. 2 shows a schematic process overview that automatically performs a backup process or a restore process via automatically performing tasks on the production server.

Initially, a backup process is to be illustrated. To this end, initially a backup tool "runBackup" is selected in a first step SB1 within the production server. The program "runBackup" performs thereupon a backup from a source directory ("source") into a backup directory or a backup memory ("backup"). The backup memory can be arranged either in the production server itself or can be arranged in another server. It is also feasible to replicate a backup within the production server on a locally different server.

After a backup has been successfully completed, an index of correspondingly secured files is produced in a step SB2 in the form of index files ("index"). The index files are, in a further step SB3, ultimately and automatically replicated from the production server to the task server so that as a result an updated list of index files is available on the task server for each backup process in the production server.

To automatically perform a restore process, an administrator retrieves a graphical user interface "restoreSelector" in the task server in a first step SR1 and selects the corresponding production server, the corresponding backup series and finally the corresponding data to be restored via the directories "backupIndex," "<server-name>" and "<series>."

Then, in a second step SR2, the program "restoreSelector" creates a task description file to restore the selected entities and stores this task description file in the directory "startTask" with the subdirectory "<server-name>."

In a further step SR3, the program "restoreSelector" triggers a port knocking process ("knock") to be performed according to the above explanations and knocks on corresponding ports of the production server. When the production server successfully opens, in step SR4 the performance process is ultimately started and the task description file for the restore process is copied from the task server to the production server. Then, the production server is again encapsulated with respect to the task server by closing all the ports.

Finally, in step SR5, the script "backupRestore" is retrieved by comparing the task description file with the present restore tasks in the production server as an ad-hoc task. The script "backupRestore" ultimately initiates a restore process within the production server to restore all the data from the memory "backup" into the original source directory "source."

Figure 3:
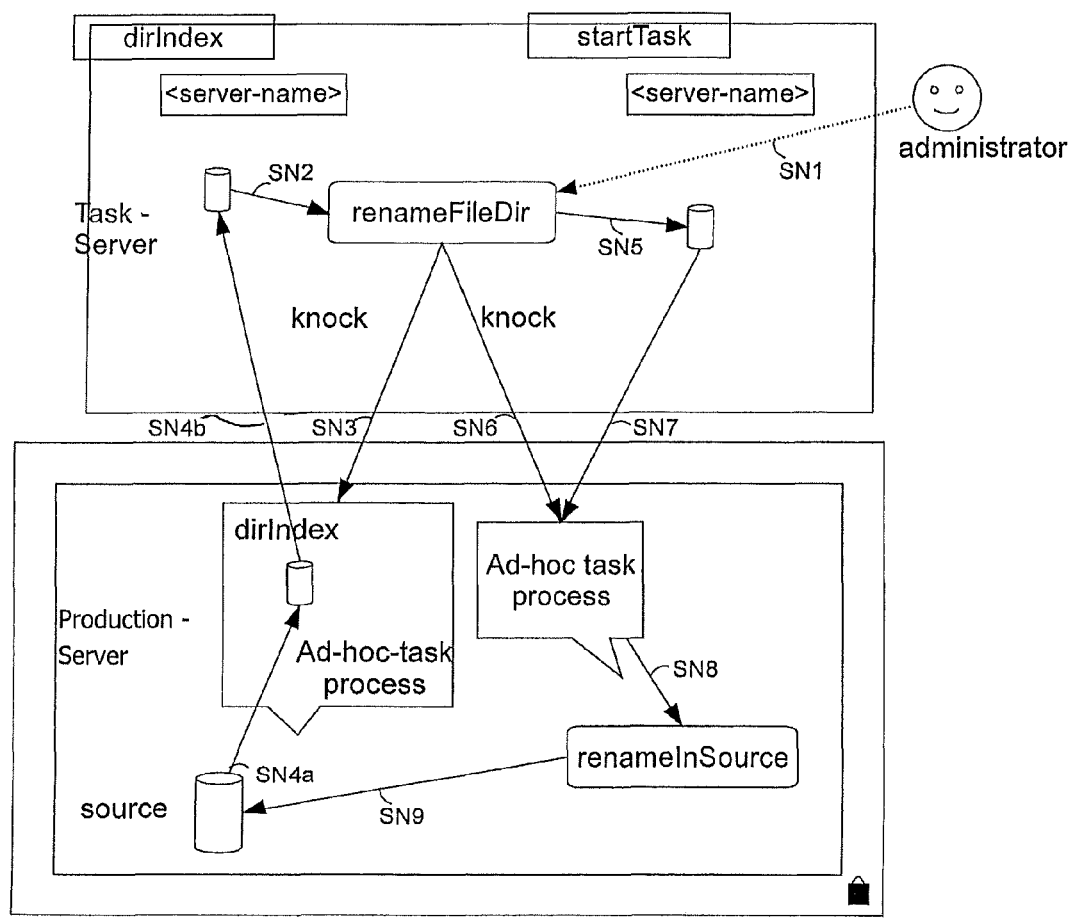
FIG. 3 shows a schematic process structure to rename files.

Finally, FIG. 3 shows a schematic process overview for renaming files in a source directory of the production server. For this purpose, an administrator selects a program "renameFileDir" in a first method step SN1 by accessing the task server. For its part, the program "renameFileDir" retrieves an index file from the directory "dirIndex" with the subdirectory "<server-name>" containing an index of all filenames in the production server.

If need be (e.g., upon initiation by the administrator or by a routine in the task server) the program "renameFileDir" starts a port knocking process in method step SN3 and "knocks" on the production server to trigger a corresponding ad-hoc task if authentication on the production server is successful, which ad-hoc tasks produces, in a step SN4a, an updated index file from a source directory "source" and stores it in the directory "dirIndex" within the production server. As soon as this is performed, the production server copies the index file from the local directory "dirIndex" to the task server into the directory "dirIndex" located therein with the subdirectory "<server-name>."

Then, the program "renameFileDir" produces, in step SN5, a task description file to automatically rename files and/or directories in the production server based on administrator instructions stored in the task description file (e.g., replace "old name" with "new name"). The corresponding task description file is stored in the directory "startTask" with the subdirectory "<server-name>" in the task server. Triggered by a new port knocking process of the program "renameFileDir" in step SN6 ("knock"), the task description file is transferred in a step SN7 to the production server where the associated task "renameInSource" is selected in method step SN8. Then, in a further, last step SN9, the task "renameIn-Source" renames source files in the source directory "source." Then, the method is completed.

In a further method, not illustrated, a boot-up process can also be triggered, for example, to automatically install, mount and boot up a production server by exchanging corresponding task description files between the production server and the key server. In this manner, particular boot-up files can be exchanged between the key server and the production server, which files contain, for example, allocation tables for the controlled boot-up of the production server. The production server can be booted-up in a controlled manner, wherein after the boot-up any data connection of the production server to the outside world (e.g., by SSH) is disconnected and the boot-up process is completed. However, a production server booted-up in this manner can then be addressed by predefined task description files and port knocking processes in accordance with the above explanations so that, as explained, corresponding tasks can be performed on the production server.

All of the illustrated process structures and structures and names of the illustrated directories, data and topologies are selected merely by way of example.

The invention claimed is:

1. A method of performing tasks on a production computer system comprising:
   retrieving at least one task description file stored on a task computer system and containing a description of a task on the production computer system,
   automatically transferring the task description file from the task computer system to the production computer system,
   causing the production computer system to check that the task description file is associated with at least one task stored on the production computer system, and
   performing the task associated with the task description file in the production computer system using the task description file, if the association check was successful, wherein
      the task computer system has open ports so that access by a user of a first user group to the task computer system is arranged,
   the production computer system keeps all the ports relevant for the method closed such that at those ports, no continuously running programs are arranged to be addressable from outside and, thereby, access by a user of the first user group to the production computer system is prevented at least while one or more of the above steps are being performed in a predetermined operating state of the production computer system, and
   a process of transferring the task description file from the task computer system to the production computer system is started upon an instruction by the production computer system and transfer of the task description file from the task computer system to the production computer system is initiated by the production computer system,
   wherein in addition to the task computer system and the production computer system, a key computer system is arranged which manages predetermined access rights and/or keys of users of a second user group and provides a configuration option to configure predetermined execution parameters for a task of the production computer system, and
   wherein access by a user of the second user group to the key computer system is arranged, but at least in a predetermined operating state of the key computer system access by a user of the first user group to the key computer system is prevented.

2. The method according to claim 1, wherein the automated transfer of the task description file from the task computer system to the production computer system comprises:
   sending a predetermined sequence of packet data from the task computer system to the production computer system, wherein predetermined ports of the production computer system are closed, and wherein the sequence addresses one or more predetermined ports of the production computer system in a predetermined order,
   checking whether a sent sequence coincides with a predefined sequence in the production computer system, and
   starting the process of transferring the task description file from the task computer system to the production computer system upon an instruction by the production computer system.

3. The method according to claim 1, wherein the task description file, before being transferred to the production computer system, is stored in a predefined exchange directory within the directory structure of the task computer system.

4. The method according to claim 1, wherein prior to transfer of the task description file from the task computer system to the production computer system, the production computer system requests file size of the task description file, and the task description file is transferred to the production computer system only when the file size does not exceed a predetermined threshold.

5. The method according to claim 1, wherein the configuration option to configure the predetermined execution parameters for the task of the production computer system comprises:
   creating the task description file using configured execution parameters, and
   automatically transferring the task description file from the key computer system to the task computer system.

6. The method according to claim 5, wherein creation of the task description file includes encrypting and/or signing contents of the task description file using a key of a user of the second user group.

7. The method according to claim 6, wherein while the production computer system checks that the created task description file is associated with at least one task stored on the production computer system, authenticity of a user of the second user group is checked.

8. The method according to claim 5, wherein prior to performing a task associated with the created task description file in the production computer system using the created task description file, validity of the configured execution parameters is checked and the associated task is only performed if the configured execution parameters are valid.

9. The method according to claim 5, wherein at least in a predetermined operating state of the production computer system access by a user of the second user group to the production computer system is prevented.

10. The method according to claim 5, wherein at least in a predetermined operating state of the task computer system access by a user of the second user group to the task computer system is prevented.

11. A data processing system comprising:
   a task computer system,
   a production computer system, and
   a key computer system,
   wherein the task computer system contains one or more predetermined task description files which each contain a description of one or more tasks on the production computer system, and wherein the production computer system is arranged to perform predetermined actions and contains one or more tasks associated with the task description files, a predefined task on the production computer system can be performed in a controlled manner by transferring a task description file from the task computer system to the production computer system, and the production computer system has a first access control unit and the task computer system has a second access control unit, which access control units are arranged to allow access by a user of a first user group to the task computer system, but to prevent access by a user of the first user group to the production computer system at least in a predetermined operating state of the production computer system such that the task computer system has open ports and the production computer system keeps all relevant ports closed, at those ports, no continuously running programs are arranged to be addressable from outside, and a process of transferring the task description file from the task computer system to the production computer system is started upon an instruction by the production computer system and transfer of the task description file from the task computer system to the production computer system is initiated by the production computer system, wherein the key computer system is arranged to manage predetermined access rights and/or keys of users of a second user group and to provide a configuration option that configures predetermined performance parameters for a task of the production computer system, wherein the key computer system has a third access control unit arranged to allow access by a user of the second user group to the key computer system, but to prevent access by a user of the first user group to the key computer system at least in a predetermined operating state of the key computer system.

12. The data processing system according to claim 11, wherein the first and second access control units are arranged to prevent access by a user of the second user group to the production computer system and/or to the task computer system at least in a predetermined operating state of the production computer system and/or the task computer system.

13. The data processing system according to claim 11, wherein the task and production computer systems are arranged as servers.

14. The data processing system according to claim 11, wherein at least the production computer system is part of a secured computer network infrastructure.

* * * * *